United States Patent
Stewart

(10) Patent No.: US 9,506,812 B2
(45) Date of Patent: Nov. 29, 2016

(54) TEMPERATURE INDICATOR

(71) Applicant: ROLLS-ROYCE PLC, London (GB)

(72) Inventor: David Andrew Stewart, Derby (GB)

(73) Assignee: ROLLS-ROYCE plc, London (GB)

( * ) Notice: Subject to any disclaimer, the term of this patent is extended or adjusted under 35 U.S.C. 154(b) by 150 days.

(21) Appl. No.: 14/507,348

(22) Filed: Oct. 6, 2014

(65) Prior Publication Data

US 2015/0114280 A1  Apr. 30, 2015

(30) Foreign Application Priority Data

Oct. 25, 2013 (GB) .................................. 1318872.7

(51) Int. Cl.
G01K 11/02 (2006.01)
G01K 11/06 (2006.01)
G01K 1/02 (2006.01)
G01K 11/12 (2006.01)

(52) U.S. Cl.
CPC .................. G01K 1/02 (2013.01); G01K 11/06 (2013.01); G01K 11/12 (2013.01)

(58) Field of Classification Search
CPC .............................. G01K 11/02; G01K 11/06
USPC .................... 116/216, 217; 374/106
See application file for complete search history.

(56) References Cited

U.S. PATENT DOCUMENTS

| 2,049,867 A * | 8/1936 | Richards ............... G09F 3/0291 116/216 |
| 2,198,162 A * | 4/1940 | Greenwald ............... H01J 5/08 106/155.1 |
| 3,002,385 A | 10/1961 | Wahl et al. |
| 3,059,474 A * | 10/1962 | Keiler ..................... G01K 1/143 116/207 |
| 3,859,856 A | 1/1975 | Keele et al. |
| 3,922,917 A | 12/1975 | Ayres |
| 4,650,707 A * | 3/1987 | Crigger .................. G01K 11/02 374/E11.004 |
| 5,135,795 A * | 8/1992 | Gregory ..................... C03C 8/02 374/E11.02 |
| 7,080,939 B1 * | 7/2006 | Fair .......................... G01K 3/04 116/216 |
| 8,490,570 B2 * | 7/2013 | Kuramoto .............. G01K 11/06 116/216 |
| 8,978,575 B2 * | 3/2015 | Liu .......................... B41J 2/195 116/217 |

(Continued)

FOREIGN PATENT DOCUMENTS

DE    10313060 A1 * 10/2004 .......... F03D 11/0008
FR    WO 2008148964 A2 * 12/2008 ............. G01K 11/12

(Continued)

OTHER PUBLICATIONS

Dec. 18, 2014 Search Report issued in European Application No. 14 18 7713.
Apr. 10, 2014 Search Report issued in GB Application No. 1318872.7.

Primary Examiner — R. A. Smith
(74) Attorney, Agent, or Firm — Oliff PLC

(57) ABSTRACT

There is disclosed a temperature indicator (10) in the form of a substrate (12) with multiple coating layers (14-22). Each coating layer (14-22) is visually or chemically distinct from the substrate (12). The material makeup of each coating layer (14-22) is different such that each coating is tailored to undergo failure at a different temperature. The presence or absence of coating layers (14-22) can provide a lasting visual indication of a temperature experienced by the indicator (10) in use. The temperature indicator (10) may be beneficial where the use of conventional temperature sensors is problematic, such as within reactor vessels or other sealed enclosures.

11 Claims, 2 Drawing Sheets

(56) References Cited

U.S. PATENT DOCUMENTS

| | | | |
|---|---|---|---|
| 2004/0146084 A1* | 7/2004 | Hachtel | G01K 11/06 374/106 |
| 2011/0048313 A1* | 3/2011 | Bako | H01J 7/42 116/216 |
| 2015/0184944 A1* | 7/2015 | Flores Simon | C09D 5/26 374/106 |

FOREIGN PATENT DOCUMENTS

| | | | | |
|---|---|---|---|---|
| GB | 1910-07813 A | 0/1910 | | |
| GB | 1160308 A | 8/1969 | | |
| JP | 59079821 A | * | 5/1984 | ............ G01K 7/18 |
| JP | H09-178572 A | 7/1997 | | |
| JP | 2001-304981 A | 10/2001 | | |
| WO | 2008/127776 A1 | 10/2008 | | |

* cited by examiner

| Company | Coating Name | Technique | Hardness | Friction | Max Operating Temperature (°C) | Other |
|---|---|---|---|---|---|---|
| Ionbond | a-C | | | | | 0% H 5-20% SP3 |
| Ionbond | Tetrabond ta-C | PVD | 5000 – 7000 | 0.02 – 0.1 | 750 | 0% H 60-80% SP3 |
| Ionbond | Ionbond-ADLC Diamolith a-C:H | PA-CVD | 2500 – 4000 | 0.02 – 0.1 | 300 | 15-25% H ~50% SP3 |
| Ionbond | Tribond 40 a-C:H:Me | PVD | 800 – 1800 | 0.1 – 0.2 | 400 | 10-20% H 35% SP3 10-20% Me |
| Oerlikon Balzers | Balinit DLC a-C:H | PACVD | >2000 | 0.1 – 0.2 | 350 | |
| Oerlikon Balzers | Balinit C a-C:H:Me | PVD | 1000 – 1500 | 0.1 – 0.2 | 300 | |
| Teers | Dymon-iC | CFUMBSIP | 1400 – 2200 | 0.03 – 0.1 | | SP3 content |
| Teers | Graphit-iC | CFUMBSIP | 1400 – 2200 | 0.05 – 0.09 | | C/Cr multilayer |
| Tecvac | DLC Diamolith | PE-CVD | 4500 | 0.05 – 0.1 | 400 | |
| Tecvac | Nitron MC | PVD | 1000 | 0.1 – 0.15 | 300 | Graded structure |
| Tecvac | InnerArmor | Hollow cathode | 1100 – 2200 | 0.07 – 0.1 | 450 – 600 | Internal, thick (50µm) DLC |

Fig. 4

TEMPERATURE INDICATOR

BACKGROUND OF THE INVENTION

This invention concerns temperature indicators and, more particularly, although not exclusively, devices for providing a lasting indication of a temperature threshold having been exceeded.

It is commonplace in engineering applications to measure operating temperatures using sensors, such as thermocouples or the like, that can provide an electrical output indicative of a temperature reading. Thus records of past operating temperature readings can be stored as data files for later access. The sensing element of such devices operates in a transient manner such that its physical state is constantly changing to current conditions. As such, a physical state of the sensor itself that is indicative of a previous temperature reading is lost in favour of a current state.

There exist a number of applications in which it is not possible, or highly problematic, to use such conventional sensors and/or in which a suitable wired or wireless data connection is not available. One such example concerns sealed reaction chambers or other enclosures/conduits that are required to be electrically isolated for safety reasons. Even if conventional sensors can be used, it may be necessary to electrically isolate the equipment as part of a safety procedure such that temperature readings can no longer be taken.

In other applications it is possible that a thermocouple or other temperature sensor is required to be sensitive over a normal operating range but may fail if a maximum temperature threshold is exceeded. Furthermore for large and/or complex systems, it may simply not be cost-effective or practical to provide conventional temperature sensors for all components or areas of the system.

In any of the above scenarios it is desirable to be able to record a maximum temperature reached by a component or fluid flow, e.g. a working fluid, coolant or the like, within the system. Such a temperature reading may provide useful engineering information for diagnosing a fault or failure mode of equipment both in a test environment as well as in the field.

It is an aim of the invention to provide a temperature indicator device which can accommodate environments or scenarios in which the use of conventional sensors is problematic. It may be considered a further aim of the invention to provide temperature indicator that can provide avisual indication of maximum temperature to which the indicator has been exposed even after the temperature has subsequently subsided.

BRIEF SUMMARY OF THE INVENTION

According to the present invention there is provided a temperature indicator comprising a substrate and a plurality of coating layers, each coating layer being distinct from the substrate, wherein each of the coating layers comprises a different material makeup such that each coating is tailored to undergo failure at a different temperature such that the presence or absence of coating layers can provide a lasting visual indication of a temperature experienced by the indicator in use.

The plurality of coating layers may be visually and/or chemically distinct from the substrate. Accordingly the lasting indication may be a visual and/or chemical indication which can be inspected after the temperature has subsequently subsided.

The failure may be partial failure, i.e. degradation of the coating, or substantially complete failure of the coating, whereby the substrate surface beneath the coating is exposed.

The coating layers may each be applied directly to the substrate, for example with each coating layer covering adjacent or separate portions of the substrate surface. Additionally or alternatively, one or more coatings may be provided one atop another such that at least a portion of one coating layer is spaced from the substrate by a portion of a second, or intermediate, layer.

According to one example, each coating layer may be visually distinct from the one or more other coating layers. Each coating layer may have a different colour, for example on a monochrome scale. The colour of one coating may be black. The colour of one or more coating may be greyscale.

Each coating layer is preferably a solid layer. Each coating layer may comprise an amorphous solid.

One, or any combination, or all of the coating layers may undergo failure by detachment from the substrate, or an intermediate coating layer, for example by way of delamination.

The temperature indicator may be a single-use device.

Each coating layer may be arranged to undergo failure at a threshold temperature that is typically beneath the melting point of the coating layer material. The threshold temperature may be determined by a temperature at which the coating undergoes oxidation.

One, or any combination, or all of the coating layers may comprise tribological coating layers. Any such layer may comprise a low coefficient of friction, such as for example below 0.25. Any layer may have a coefficient of friction of less than or equal to 0.2 or 0.1. The coating layer coefficient, of friction may be lower than that of the substrate.

One, or any combination, or all of the coating layers may have a hardness that is greater than that of the substrate. Any coating layer may have a Vickers Hardness of greater than 700 or 800 or 1,000. In some examples the hardness may be 1,500 or higher, such as in the region of 2,000.

The substrate may be arranged to be attached to a wall, typically an internal wall, of equipment in use. Alternatively, the substrate may comprise said wall. The coatings and/or substrate are typically arranged on an internal and/or fluid washed surface of the equipment, such as a vessel, container or conduit wall.

One, or any combination, or all of the coating layers may be provided on the substrate by a deposition process, such as physical vapour deposition, chemical vapour deposition or an ion plating process.

One, or any combination, or all of the coating layers may comprise or consist of a carbon based coating material, such as for example a Diamond Like Carbon (DLC) material.

The substrate may comprise one or more temperature markings, such as temperature values and/or a temperature scale. The temperature markings) may be formed in, or integral with, the substrate material itself, for example by stamping, etching, embossing or impressing the marking(s) in the substrate surface.

The present invention is particularly advantageous in that it allows solid surface coatings to be used in order to provide temperature indications. Such solid coatings are beneficial in that the coatings can be relatively inert, whilst still offering a readily perceivable change beyond a threshold temperature. That is to say, such coatings need not be of detriment to the chemical environment within the equipment on which the temperature indicator is provided. This is particularly important for certain enclosures, such as reaction vessels or the like, in which any kind contaminant is to be avoided.

BRIEF DESCRIPTION OF THE DRAWINGS

Practicable examples of the invention will now be described in further detail, for illustration only, with reference to the accompanying drawings, in which.

DETAILED DESCRIPTION OF THE INVENTION

Figure 1:
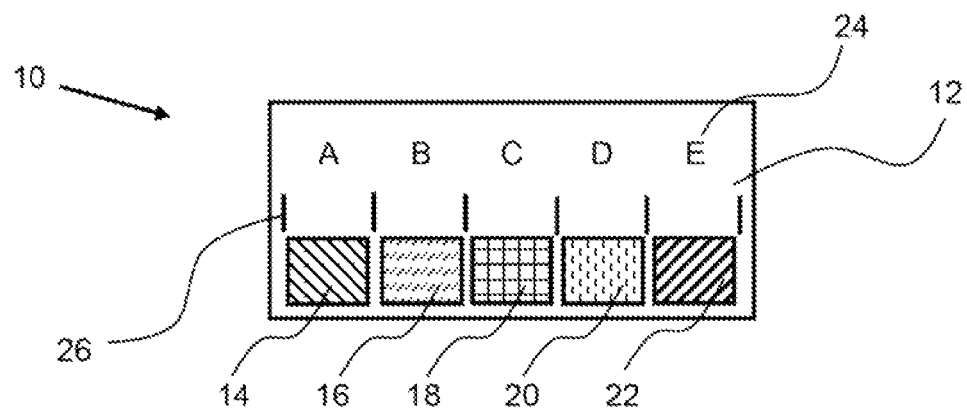
FIG. 1 shows a temperature indicator according to an example of the invention.

Turning firstly to FIG. 1, there is shown an example of a temperature indicator device 10 according to the invention. The temperature indicator comprises a substrate 12 in the form of a planar body (e.g. a panel or strip) of backing material. The substrate material is typically a metal, although its precise material makeup may vary dependent on the environment in which the temperature indicator 10 is to be applied.

On a first, or front, side of the substrate panel 12, there is provided a plurality of coatings 14-22. Each coating is a partial coating layer covering only a portion of the area of the first side of the substrate 12.

Each of coatings 14-22 has different material properties. This is achieved in this example by each coating being formed of a different material. Additionally or alternatively, each coating may be applied using different parameters during the coating process or else using different coating processes altogether, as will be explained in further detail below. The different nature of the coatings provides a single device having a plurality of coatings that each behave differently under elevated temperature conditions. In this example, the structural integrity of the coatings and/or the bond formed (e.g. at an interface) between the coating and the substrate surface is tailored to break down at different temperature and/or pressure conditions for each coating.

The coatings in this example are provided in a linear arrangement on the substrate surface, for example with each coating being arranged alongside the adjacent coating. The coatings are arranged in an ascending order from one end of the array to the other with respect to the relevant material property. In this example the relevant material property comprises the failure temperature of the coating.

The substrate has visual indicia thereon, which take the form of temperature markings 24. The temperature markings represent a temperature scale for which the indicator device 10 is functional. In this example the markings 24 take the form of values of temperature, denoted A-E, at which the coatings are intended to fail. Each marking is located in the scale alongside the corresponding coating. A delimiting marker 26 may be provided between or alongside (e.g. at the midpoint of) each adjacent coating in the array.

In this example, the coatings 14-22 are of substantially equal width and/or area and are tailored to undergo failure at substantially equal temperature spacings, Accordingly the delimiting markers 26 serve as a linear temperature scale along the substrate.

In other embodiments, the delimiting markers may be provided as a linear temperature scale and the coatings may be unevenly spaced, for example if tyke coatings do not undergo failure at equally spaced temperatures. Thus the coatings may be centred on the corresponding failure temperature on the temperature scale. In some embodiments, the coatings may be of different widths and/or areas, for example so as to span from the corresponding failure temperature to the mid point between a failure temperature of one or more adjacent coating.

Figure 3:
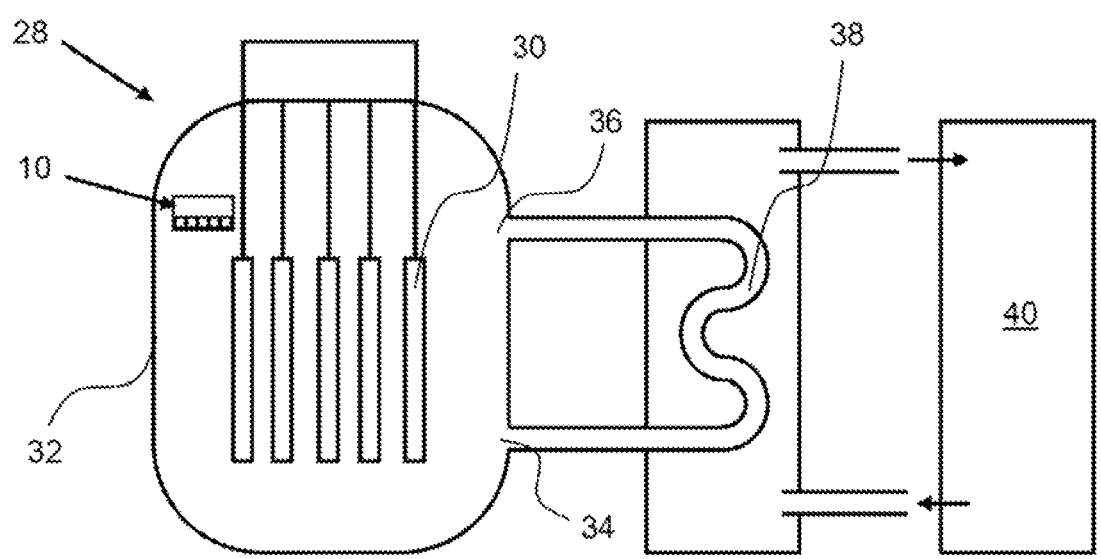
FIG. 3 shows an example of equipment including a temperature indicator in accordance with the present invention; and, FIG. 4 shows a table of different examples of coating materials that may be used for the purpose of the invention.

FIG. 3 shows an example of equipment comprising the temperature indicator 10 of FIG. 1. The equipment in this example takes the form of a pressurised water reactor 28 in which control rods 30 are maintained in a sealed vessel 32. The vessel is filled with liquid coolant which flows around a primary cooling circuit. In this regard, the vessel has inlet 34 and outlet 36 conduits in communication with a heat exchanger 38, which, in conjunction with the vessel 32 itself, form the primary cooling circuit. In use, the water is heated within the vessel 32 and flows to the heat exchanger 38, where heat is transferred to a secondary circuit 40.

The coolant in the primary circuit is maintained well above its normal boiling point. This is achieved by maintaining the entire primary cooling circuit at an elevated pressure of typically greater than 100 bar. Thus the entire primary cooling circuit represents a sealed system and the secondary cooling circuit can operate at a reduced (e.g. atmospheric) pressure.

The temperature indicator 10 is rigidly mounted to the interior wall of the vessel 32 via the reverse side of the substrate 12 such that the front side is exposed to the internal volume of the vessel. The substrate may be attached to the interior wall by any means suited to the interior environment such as, for example, using mechanical fasteners or else by welding or similar methods.

Whilst a pressurised water reactor represents one example of equipment in which the invention may be particularly advantageous, it is to be noted that the temperature indicator may be provided in a significant number of different types of equipment, typically within an internal volume that is inaccessible from the exterior of the equipment in use. The invention is particularly beneficial for use within enclosures, vessels or conduits in which the internal volume is sensitive to the external environment and must be sealed in use. Additionally or alternatively the invention may be applied to pressurised or other isolated enclosures.

For varying scenarios of use, it may be possible to affix the temperature indicator to the relevant wall of the equipment using alternative means, such as for example by way of an adhesive. In some examples, it is possible to form the plurality of coatings on the wall of the equipment itself, or else upon a coating layer thereon, such that the wall itself provides the substrate. In such examples, the indicia (e.g. temperature scale or markings) described above may also be provided on the wall. Providing an intermediate substrate for attachment to the wall has the benefit that a relatively small strip of substrate may be simpler to coat as required and may allow multiple temperature indicators to be coated at once.

In use, the coatings 14-22 of the temperature indicator typically remain intact within the normal internal operating temperature range of the equipment to which it is mounted. Thus each coating typically degrades at temperature threshold that is greater than the upper threshold temperature of the equipment. In such an example, the temperature indicator can provide a record of the maximum temperature reached during a fault or failure of the equipment that would typically require inspection and/or decommissioning of the equipment.

When the temperature inside the equipment rises to a temperature that is greater than the threshold temperature for one or more of the coatings 14-22, each coating, for which the temperature threshold has been exceeded will start to degrade. In the present embodiment, the preferred failure mechanism is the delamination of the coating from the substrate. Such a failure mechanism allows a substantial portion of, or else the entirety of, the coating to be removed in a relatively short time and/or temperature window so as to provide a clear and accurate indication that a specific temperature threshold has been reached.

In other examples, it is possible that internal stress, phase change or other failure mechanisms may be used to instigate the degradation (e.g. breakup) of the coating layers. In various examples of the invention, different failure mechanisms may be used for different coatings. Whilst it is possible that, for some applications, a temperature-sensitive chemical reaction between the coating and an internal fluid in the equipment may be used to provide the desired temperature indication, in the present example of a pressurised water reactor such a failure mechanism is generally undesirable to avoid any detrimental chemical alteration to coolant within the vessel interior.

The delamination/breakdown of the coatings is irreversible so as to provide a lasting record of the maximum temperature that was exceeded by the equipment interior in the vicinity of the temperature indicator.

Figure 2:
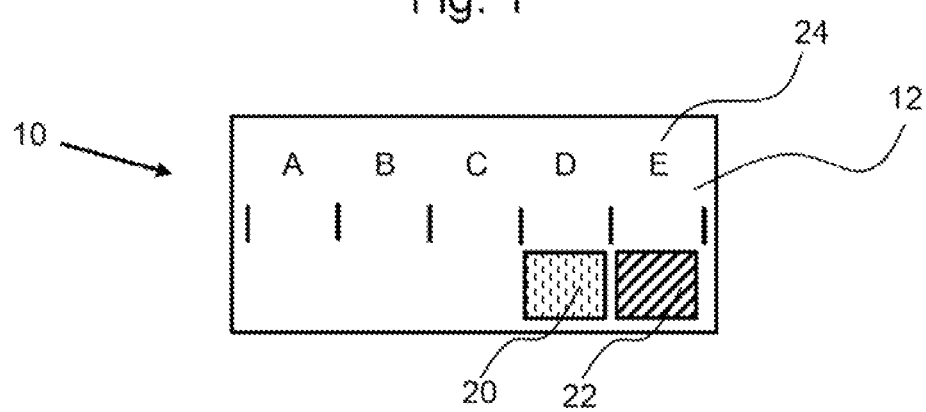
FIG. 2 shows the temperature indicator of FIG. 1 after use.

An example of the temperature indicator 10 after use is shown in FIG. 2, in which the coatings 14, 16 and 18 have degraded to expose the substrate behind. Thus the temperature indicator in FIG. 2 gives a clear visual indication that the indicator experienced a maximum temperature that was greater than temperature C but lower than temperature ID in use. Accordingly anyone inspecting the indicator can obtain a quick and simple visual indication of the condition within the equipment during a prior failure or fault scenario. Whilst the temperature indicator only provides an indication within a predetermined range, such information can nonetheless be useful to an engineer in understanding the internal conditions after an adverse event. As well as being useful for equipment in service, this ability may also be of significant use in a testing environment.

It is preferred that each of the different coatings 14-22 are visually distinct so as to provide a clear visual indication of whether or not a particular coating is intact. The visual distinctions may comprise different coating material colours, which may range for example, from black to silver or white. Other colours may be used provided they are chemically compatible with the vessel interior environment. However it is not essential that all coatings are visually distinct. For example in other embodiments, any one coating need only be visually distinct from its adjacent coatings. An alternating colour scheme could be provided to this end. Furthermore, where visual indica 24 or 26 are provided on the substrate, the coating need only be visually distinct from the substrate rather than the other coatings. Thus the lack of a coating could be simply checked against the indicia instead of requiring comparison with other coatings. However, in an embodiment in which each coating is visually distinct, the coatings can be colour coded, such that the indicia 24 and/or 26 need not be provided on the substrate.

In one further example, indicia 24, 26 could be provided on the substrate behind the location of an associated coating such that the indicia are only revealed once one or more coating has been removed. For some types of indicia, such as engraved indicia, the indicia may be better provided on the reverse of the substrate to avoid it being visible through the thin coating layer even when intact.

The inventor has identified a non-exhaustive range of coating materials that may be used for the purpose of the present invention as will be described in further detail below with reference to FIG. 4. The material properties of any one or more of those example coatings may be applied to one or more coating of the temperature indicator and may provide a limiting definition of one or more embodiment of the invention. It is noted that conventional temperature information provided by suppliers for such materials may need to be reassessed for use of the coating within a pressurised liquid environment. In particular it has been found that when coatings are subjected to temperatures within a pressurised liquid environment, the failure/oxidation temperature of the coating is typically lower than that specified for a gas environment under atmospheric pressure.

In general, the coatings may collectively be referred to as tribological or anionic coatings. In particular the coatings are selected to be inert and resistant to normal wear and/or damage. The cohesive/adhesive bond strength of the coating provides an important property in ensuring that the coating will remain physically intact until an intentional delamination event occurs, at which point the coating will be substantially removed from the substrate. It has been found that a relatively clear indication of coating presence or absence can be provided, rather than a coating undergoing a prolonged breakup process over a relatively long temperature range, whereby visual inspection of a partial coating can result in an indeterminate assessment.

However in some embodiments, a coating may provide minimal visual indication of failure, particularly when the maximum temperature achieved is close to the threshold temperature and/or is relatively short-lived. For any such scenario, a chemical analysis may be performed to determine the state/loss of the coating more accurately. Such analysis may also be performed where it is desirous to determine a maximum operating temperature achieved with greater accuracy.

The example coating materials comprise carbon and, in the particular examples of FIG. 4, the coatings may comprise stabilised amorphous carbon, such as, for example, a so-called Diamond Like Carbon (DLC) or a graphitic-type material.

The coatings are preferably laid down by thin film deposition or growth techniques. Such processes typically allow vapour or gas phase materials to be laid down as solid coatings on the substrate. Techniques may be used such as Physical Vapour Deposition (PVD)—including sputtering and hollow cathode techniques; Chemical Vapour Deposition (CVD); Pressure Assisted CVD (PACVD); and Plasma Enhanced CVD (PECVD).

Some coating techniques that allow line of sight coating processes to be used can thus allow use of a mask so that predetermined areas and shapes of coating can be applied to the substrate. In this manner a series of partial coatings can be applied as described above. Additionally or alternatively, it is possible to apply a complete coating to a substrate and subsequently strip away all but a desired coating area in the final temperature indicator. In such an example, the coating area to be retained may be masked during the stripping process. Additionally or alternatively, it is possible to use multiple substrates, for example, such that a first substrate is coated and then placed on a further substrate. Using any, or any combination, of the above processes allows multiple partial coating areas to be provided in a final product.

The maximum operating temperatures given in FIG. 4, although not precisely equal to the failure temperature of the coatings, provides a good indication of the temperature range or increments between the failure temperatures of each coating. It is possible to provide coatings with failure temperatures that differ by tens of degrees, such as for example 40° C., 50° C. or more, from the adjacent coating in the array. Temperature increments are preferably less than 100° C. or 200° C. It is preferable that two or more, and more preferably three or more, coatings are provided offering such differences in failure temperatures.

The temperature range of the temperature indicator as a whole may be, for example, between 100° C. and 400° C. or 500° C.

By carefully selecting appropriate coatings, each having a unique failure temperature that is characteristic of each coating itself, then an array can be constructed whereby the temperature experienced by the indicator in use can be determined by the failure/non-failure of the coatings in the array. By choosing the number and identity of the coatings, the range and sensitivity of the sensor can be altered.

The benefit of using the kinds of materials described above is that the coatings, by virtue of their structural integrity, are highly unlikely to fail for any reason other than the environmental conditions in use as discussed above. Furthermore the coatings are chemically stable and thus compatible with the environment within reaction vessels or other similar enclosures, within which the internal chemistry is particularly sensitive. For example, thermal paints or other materials which undergo oxidation to provide a change in colour are incompatible with such environments. Paints also contain anions such as chlorides, sulphates etc, all of which are unwanted in a PWR as they can cause stress corrosion cracking etc. In contrast the materials described above for use with the present invention may offer chemically compatibility with a wider range of controlled operating environments.

The invention claimed is:

1. A temperature indicator comprising:
   a substrate and
   a plurality of coating layers, each coating layer being distinct from the substrate,
   wherein each of the coating layers comprises a different material makeup such that each coating is tailored to undergo degradation at a different temperature and the degradation is failure of the coating layers at the interface between the coating layer and the substrate, thereby causing detachment of the coating from the substrate and a visual indication of a temperature experienced by the indicator is provided by the presence or substantial absence of the coating layer on the substrate, in that one or more of the coating layers is arranged to undergo degradation by failure of the coating layer at a threshold temperature that is beneath the melting point or oxidation temperature of the coating layer material.

2. The temperature indicator of claim 1 wherein
   each coating layer covers a separate portion of a surface area of the substrate.

3. The temperature indicator of claim 1 wherein the coating layer has any or any combination of a different colour, chemistry and/or surface texture from the substrate.

4. The temperature indicator of claim 1 wherein
   each coating layer is visually distinct from one or more further coating layers.

5. The temperature indicator of claim 1 wherein
   one or more of the coating layers comprises an amorphous solid layer.

6. The temperature indicator of claim 1 wherein
   one or more of the coating layers is a tribological coating layer.

7. The temperature indicator of claim 1 wherein
   one or more of the coating layers comprises a graphite or diamond like carbon material.

8. The temperature indicator of claim 1 wherein
   one or more of the coating layers is provided on the substrate by a deposition process.

9. The temperature indicator of claim 1 wherein
   the coating layers are provided on the substrate in an ordered array corresponding to the degradation temperature of each coating layer.

10. The temperature indicator of claim 1 wherein
    the degradation temperature of each coating layer differs from the degradation temperature of the other coating layers by 50° C. or more.

11. The temperature indicator of claim 1 wherein
    one or more temperature markings is provided on the substrate, said temperature marking remaining intact at a temperature above the degradation temperatures of the coatings.

* * * * *